United States Patent [19]

Kooi

[11] 4,240,689
[45] Dec. 23, 1980

[54] TELESCOPE RETICLE ADJUSTING MEANS
[75] Inventor: J. Peter E. Kooi, Succasunna, N.J.
[73] Assignee: Keuffel & Esser Company, Morristown, N.J.
[21] Appl. No.: 19,372
[22] Filed: Mar. 9, 1979
[51] Int. Cl.³ .............................................. G02B 27/32
[52] U.S. Cl. ...................................... 350/10; 356/247
[58] Field of Search ................. 350/10; 356/247, 248, 356/249, 250, 251, 252, 253, 254, 255; 33/245, 246, 247, 248, 249, 250, 297, 298

[56] References Cited
U.S. PATENT DOCUMENTS

| | | | |
|---|---|---|---|
| 2,496,045 | 1/1950 | Ford | 350/10 X |
| 2,528,130 | 12/1951 | Ford | 350/10 X |
| 2,949,816 | 8/1960 | Weaver | 350/10 X |

Primary Examiner—John K. Corbin
Assistant Examiner—Matthew W. Koren
Attorney, Agent, or Firm—Lionel N. White

[57] ABSTRACT

Means for centering a reticle on the optical axis of a telescope comprises, within the telescope body, a split collar tapped to accommodate two pairs of diametrically opposed adjustment screws which bear upon rectilinear surfaces of a centrally located reticle mount. The arrangement provides a dust-proof seal for the telescope interior and ensures against stresses tending toward reticle misalignment.

10 Claims, 5 Drawing Figures

U.S. Patent    Dec. 23, 1980    4,240,689
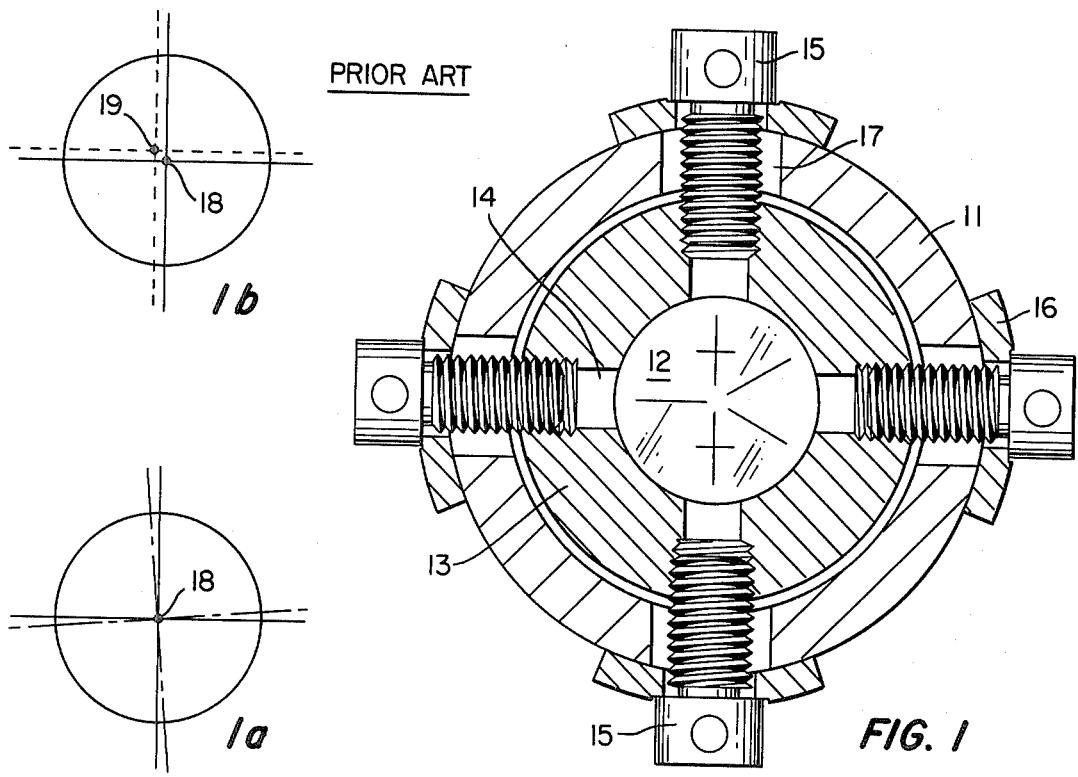
PRIOR ART
FIG. 1
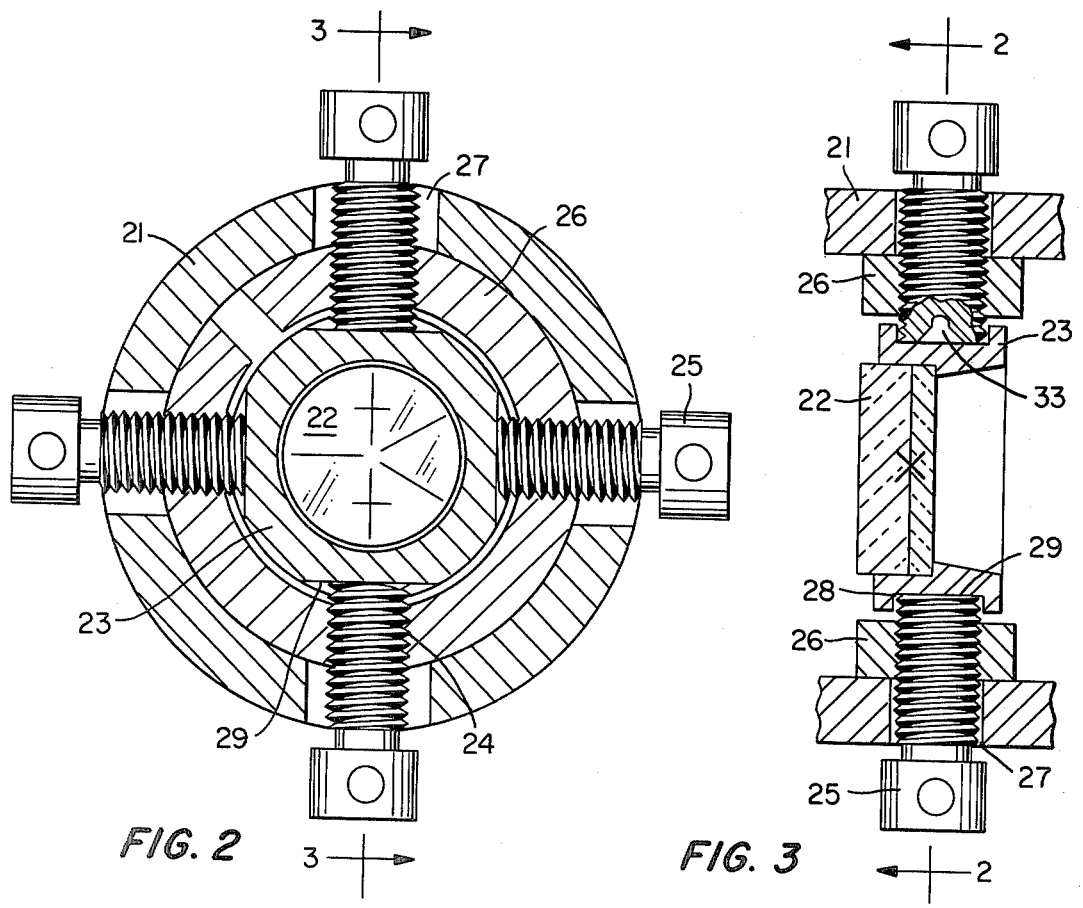
FIG. 2
FIG. 3

TELESCOPE RETICLE ADJUSTING MEANS

BACKGROUND

The telescope of optical geodetic instruments, such as theodolites, transits, levels, and the like, comprises a reticle located on the optical axis by means of which an operator establishes a datum for subjects under observation. Although such reticle elements may be located substantially on the optical axis during manufacture of the telescope, it is essential that means be provided for adjustment of the position of the reticle more precisely subsequent to assembly of the instrument. It is not uncommon for effective operation of geodetic telescopes to depend upon the maintenance of reticle adjustment within a range about 1-2 micrometers.

Such reticle adjusting means have remained virtually unchanged for many years and are typically as represented in U.S. Pat. No. 2,937,570, or more specifically shown in FIG. 1 of the instant drawings. As there depicted, a prior art reticle adjustment comprises a reticle mount 13 in which reticle glass 12 is permanently affixed by means of adhesive or the like. The mount is situated within the telescope body 11 where it is adjustably held by four diametrically opposed screw members, such as capstan screws 15, received in tapped bores 14 in the body of mount 13. Screws 15 communicate with mount 13 through access ports 17 in the wall of telescope body 11. Shutters 16 provide flat seats for the shoulders of screws 15 and further provide means for sealing ports 17, thus protecting the interior of the telescope from environmental hazards such as dust, moisture, and the like.

Although this previous form of reticle adjustment has served quite well in effecting rotational adjustment of the reticle, it has suffered from an inherent instability with respect to lateral adjustment. The cause of this instability would appear to be such as is schematically represented in FIGS. 1a and 1b. As is seen in FIG. 1a, rotational adjustment of the reticle, which is accomplished by loosening at least two adjacent ones of screws 15 and rotating the mount/screw assembly as a whole, results in minute displacement of the axes of screws 15 from an original position represented by the solid lines in FIG. 1a to a new position represented by the broken lines. During such a rotational adjustment, however, the point of intersection of the axes of the screws remains fixed at the mechanical center 18 of the telescope body and retightening of the screws to again lock the mount and reticle in a fixed position has no effect on the stability of the system.

On the other hand, a lateral adjustment of the reticle, accomplished by loosening the adjustment screws and rotating opposing pairs of such screws to shift the position of mount 13, results in displacement of the screw axes, as shown by the dotted lines in FIG. 1b, with simultaneous displacement of the point of intersection 19 of these axes from the center 18 of the telescope body. Although it would appear that the final tightening of the adjustment screws would effect an immobility in this position of the reticle mount, there in fact exists, probably due in part to the curvature of the shutter elements 16, a stress in the assembly tending to urge the screw axes back toward the center 18 of the telescope body. This instability, combined with environmental variations and the mechanical shock to which geodetic instruments are often exposed, results in the need for repeated readjustment of the reticle of instruments comprising these prior art types of adjusting means.

As will be seen in greater detail in the following description, the reticle adjusting means of the present invention eliminates the instability which has heretofore made optical geodetic instruments so susceptible to misalignment during the course of ordinary use and handling.

SUMMARY

Unlike previous reticle adjusting means wherein the reticle mount body is tapped to receive the adjusting screws, thus requiring movement of these elements as a single unit, the present invention utilizes a tapped split collar within the telescope body in combination with a plurality of flat surfaces on the reticle mount upon which the adjusting screws bear. As a result, the reticle mount is dissociated from the adjusting screws and may move laterally of the telescope axis while the adjusting screws maintain their stable position with respect to the telescope body, i.e. their axes are at all times coincident with radii of the body. The split collar serves to effectively seal the interior of the telescope body from the external environs, thus eliminating the necessity of the shutter element arrangement of the prior art adjusting means.

DRAWINGS

In the accompanying drawings:

FIG. 1 is a view of a prior art telescope, taken in section on a plane perpendicular to the telescope axis, showing a typical prior reticle adjusting arrangement; 1a and 1b being schematic representations of the displacement of adjusting screws axes in such prior art adjusting means;

FIG. 2 is a view, taken in section along 2—2 of FIG. 3, of a telescope comprising the reticle adjusting means of the present invention; and FIG. 3 is a view of the invention, taken in section at 3—3 of FIG. 2.

DESCRIPTION

As seen in FIG. 2, the telescope body 21 of a preferred embodiment of the present invention comprises four diametrically opposed substantially oblong ports 27 through which adjusting screws 25 gain access to the interior of the instrument. A split collar 26 of such a diameter as to provide an interference fit is positioned within body 21 which may include a circumferential channel in its interior wall as a guide for the collar. Four tapped bores 24 are located in collar 26 so as to be aligned with telescope body ports 27 in order to receive each of four adjusting screws 25. The threads of the screws and taps are preferably of sufficient precision to effect a Class 3 fit.

Loosely positioned within collar 26 is reticle mount 23 in which reticle glass 22 is cemented in the usual manner. Instead of the tapped bores 14 (FIG. 1) utilized in prior instruments, four diametrically opposed portions of the circumference of reticle mount 23 are machined to form slots 28 of which the bottom surfaces 29 are flats, the opposite pairs of which are substantially parallel.

When the noted elements are assembled, as shown in FIG. 2, counter-rotation of the opposing pairs of adjusting screws 25 will bring the ends of each of the screws, the centers of which are preferably relieved, as with a countersink 33, in order to maintain flat contacting surfaces, to bear upon flats 29 of reticle mount 23 to firmly immobilize the reticle at the desired attitude within the telescope body 21. Turning screws 25 to thus bear upon reticle mount 23 results in a reactive force which in turn causes split collar 26 to bear firmly upon the inner surface of body 21 to form a tight, dust-free seal at ports 27 as well as to immobilize the collar/mount subassembly.

Rotary adjustment of the reticle is readily accomplished by loosening an adjacent pair of screws 25 to free the firm engagement between collar 26 and body 21 to enable rotation of reticle mount 23 to set the reticle lines in proper desired attitude. Alternatively, or in conjunction with rotary adjustment, lateral adjustment is effected by cooperative rotation of opposed pairs of adjusting screws 25. After the desired adjustments have been made, screws 25 are again rotated to bear upon reticle mount flats 29 and firmly press collar 26 against the interior of body 21 to immobilize reticle mount 23.

It will thus readily be seen that the adjustment of a reticle by means of the present invention creats none of the instability inherent in a prior art assembly. That is to say, not only during rotary adjustment of the reticle, but also in transverse adjustment, the longitudinal axes, and thus the thrust vectors of each of adjusting screws 25, point directly toward and intersect at the mechanical center of telescope body 21, indicated at 18 in FIGS. 1a and 1b. The previous stresses tending toward reticle misalignment are thereby eliminated.

What is claimed is:

1. In an optical instrument comprising a telescope and reticle means situated in the optical path of said telescope, the improvement in means for adjusting the reticle with respect to the axis of said optical path, said improvement comprising:
   (a) a telescope body of circular interior cross-section;
   (b) a plurality of ports communicating between the exterior and interior of said telescope body, said ports being substantially equally spaced along an inner circumference of said body;
   (c) a cylindrical collar located within and in contact with the interior of said body, the wall of said collar being longitudinally split to allow forcible expansion and compression of the diameter thereof;
   (d) a plurality of tapped bores through the wall of said collar, said bores being in substantial radial alignment with said ports;
   (e) reticle means comprising a reticle support situated within said collar, said support having a diameter sufficiently smaller than the inner diameter of said collar to allow freedom of radial movement of said support;
   (f) a plurality of flat areas on the surface of said support, said areas being in substantial radial alignment with and perpendicular to said collar bores; and
   (g) a plurality of screws in respective threaded engagement with said collar bores and contact with said flat support surface areas, said screws being of sufficient length to be manipulable from the exterior of said telescope body by way of said body ports.

2. The improvement according to claim 1 wherein said plurality of screws are four in number and spaced substantially 90° apart about said reticle support.

3. The improvement according to claim 2 wherein said plurality of flat areas are four in number and spaced substantially 90° apart upon the circumferential surface of said reticle support.

4. The improvement according to claim 3 wherein said flat areas comprise the respective bottom surfaces of slots formed in said support surface and extending transverse to the optical axis of said reticle means.

5. The improvement according to claim 4 wherein said slots are of a width substantially equal to the diameter of said screws.

6. The improvement according to claim 1 wherein the dimension of said ports in the direction paralleling the longitudinal axis of said telescope body is substantially equal to the diameter of said screws.

7. The improvement according to claim 1 wherein the dimension of said ports in the direction of the circumference of said telescope body is substantially greater than the diameter of said screws.

8. The improvement according to claim 1 wherein each screw end in contact with one of said reticle support flat areas is flat and substantially perpendicular to the longitudinal axis of said screw.

9. The improvement according to claim 8 wherein each said screw end includes an axial countersink, thereby forming an annular flat support-contacting surface.

10. The improvement according to claim 1 wherein the relaxed diameter of said collar is of such a diameter as to form an interference fit within said telescope body.

* * * * *